United States Patent
Suissa

(10) Patent No.: US 9,370,982 B2
(45) Date of Patent: Jun. 21, 2016

(54) METHOD AND APPARATUS FOR SUSPENSION DAMPING INCLUDING NEGATIVE STIFFNESS

(71) Applicant: GM GLOBAL TECHNOLOGY OPERATIONS LLC, Detroit, MI (US)

(72) Inventor: Avshalom Suissa, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 14/106,945

(22) Filed: Dec. 16, 2013

(65) Prior Publication Data
US 2015/0165852 A1    Jun. 18, 2015

(51) Int. Cl.
*B60G 11/56*    (2006.01)
*B60G 15/06*    (2006.01)
*B60G 11/14*    (2006.01)

(52) U.S. Cl.
CPC ............... *B60G 11/56* (2013.01); *B60G 11/14* (2013.01); *B60G 15/06* (2013.01); *B60G 15/065* (2013.01); *B60G 2500/22* (2013.01)

(58) Field of Classification Search
CPC ................................................. B60G 15/065
See application file for complete search history.

(56) References Cited

U.S. PATENT DOCUMENTS

| | | | | |
|---|---|---|---|---|
| 3,368,824 A * | 2/1968 | Julien | ................. | B60G 13/001 105/198.7 |
| 4,154,461 A * | 5/1979 | Schnittger | ............. | B60G 15/06 267/218 |
| 4,583,752 A * | 4/1986 | Breitbach | .............. | B60G 11/32 280/124.165 |
| 4,949,573 A * | 8/1990 | Wolfe | .............. | B60G 17/01933 188/267 |
| 4,969,662 A | 11/1990 | Stuart | | |
| 5,337,864 A * | 8/1994 | Sjostrom | ................ | B60G 13/18 188/266.2 |
| 6,290,035 B1 | 9/2001 | Kazmirski et al. | | |
| 6,668,618 B2 * | 12/2003 | Larson, III | ............ | C23C 14/546 204/192.13 |
| 6,688,618 B2 | 2/2004 | Schmidt et al. | | |
| 6,761,372 B2 * | 7/2004 | Bryant | ..................... | B60G 3/20 280/124.141 |
| 6,793,049 B2 | 9/2004 | Kazmirski | | |
| 7,150,451 B2 | 12/2006 | Soles et al. | | |
| 7,357,402 B2 * | 4/2008 | Berghus | ................. | B60G 11/00 280/124.109 |
| 7,963,377 B2 | 6/2011 | Quinn et al. | | |
| 8,185,269 B2 | 5/2012 | Li et al. | | |
| 8,210,547 B2 | 7/2012 | Rodenbeck | | |
| 8,308,170 B2 * | 11/2012 | Van Der Knaap | . | B60G 17/0152 280/5.5 |
| 8,469,164 B2 * | 6/2013 | Kondo | ................. | B60G 13/001 188/266.1 |
| 8,575,804 B2 | 11/2013 | Nakatsugawa | | |
| 8,641,052 B2 * | 2/2014 | Kondo | ................... | B60G 11/58 188/266.2 |
| 8,938,333 B2 * | 1/2015 | Bose | .................. | B60G 17/0165 701/37 |
| 9,102,209 B2 * | 8/2015 | Giovanardi | ........ | B60G 17/0165 |
| 9,133,900 B2 * | 9/2015 | Trangbaek | .............. | F16F 6/005 |

(Continued)

FOREIGN PATENT DOCUMENTS

| | | | |
|---|---|---|---|
| DE | 3608934 A1 * | 9/1987 | ............. B60G 11/48 |
| DE | 4014466 A1 | 11/1991 | |

(Continued)

*Primary Examiner* — Nicole Verley

(57) ABSTRACT

A suspension assembly between a sprung element and an unsprung element includes load-carrying spring arranged in parallel with a negative stiffness element between the sprung element and the unsprung element. The spring is configured with a positive spring rate to support a static load of the sprung element. The negative stiffness element is configured with a negative spring rate and to exert a force opposing the spring rate of the spring. The negative spring rate has a magnitude that cancels the positive spring rate at a zero deflection point of the suspension assembly.

10 Claims, 5 Drawing Sheets

(56) References Cited

U.S. PATENT DOCUMENTS

| | | | |
|---|---|---|---|
| 2007/0137913 A1* | 6/2007 | Wohanka | B60G 11/56 180/197 |
| 2008/0079280 A1* | 4/2008 | Nakamura | B60G 17/0485 296/35.3 |
| 2011/0297497 A1 | 12/2011 | Kim | |
| 2013/0087985 A1 | 4/2013 | Marur | |
| 2015/0165858 A1* | 6/2015 | Suissa | B60G 17/0408 280/5.515 |

FOREIGN PATENT DOCUMENTS

| | | | | |
|---|---|---|---|---|
| EP | 0127741 A1 | | 12/1984 | |
| FR | 2840257 A1 | * | 12/2003 | B60G 15/065 |
| GB | 1075043 A | * | 7/1967 | B60G 13/001 |
| WO | WO 2009136509 A1 | * | 11/2009 | B60G 15/065 |

* cited by examiner

METHOD AND APPARATUS FOR SUSPENSION DAMPING INCLUDING NEGATIVE STIFFNESS

TECHNICAL FIELD

This disclosure relates to devices for damping vibration between a sprung element and an unsprung element.

BACKGROUND

The statements in this section merely provide background information related to the present disclosure. Accordingly, such statements are not intended to constitute an admission of prior art.

Suspension systems are employed to decouple a sprung element from impulse and vibration energy inputs that are experienced at an unsprung element by absorbing and dissipating vibration inputs. Suspension systems are employed on both stationary systems and mobile systems including passenger vehicles. Known suspension system elements include spring elements coupled in parallel and/or in series with damping elements, e.g., shock absorbers that include fluidic or pneumatic energy absorbing and dissipating features.

When employed on a vehicle system, suspension systems including springs and dampers are configured to coincidently provide performance characteristics related to passenger ride comfort, vehicle handling and road holding capability. Ride comfort is generally managed in relation to spring constant of the main springs of the vehicle, spring constant of passenger seating, tires and a damping coefficient of the damper. For optimum ride comfort, a relatively low damping force for a soft ride is preferred. Vehicle handling relates to variation in a vehicle's attitude, which is defined in terms of roll, pitch and yaw. For optimum vehicle handling, relatively large damping forces or a firm ride are required to avoid excessively rapid variations in vehicle attitude during cornering, acceleration and deceleration. Road holding ability generally relates to an amount of contact between the tires and the ground. To optimize road handling ability, large damping forces are required when driving on irregular surfaces to prevent loss of contact between individual wheels and the ground. Known vehicle suspension dampers employ various methods to adjust damping characteristics to be responsive to changes in vehicle operational characteristics, including active damping systems.

SUMMARY

A suspension assembly between a sprung element and an unsprung element includes load-carrying spring arranged in parallel with a negative stiffness element between the sprung element and the unsprung element. The spring is configured with a positive spring rate to support a static load of the sprung element. The negative stiffness element is configured with a negative spring rate and to exert a force opposing the spring rate of the spring. The negative spring rate has a magnitude that cancels the positive spring rate at a zero deflection point of the suspension assembly.

BRIEF DESCRIPTION OF THE DRAWINGS

One or more embodiments will now be described, by way of example, with reference to the accompanying drawings, in which:

FIGS. 8-1, 8-2 and 8-3 illustrate elements of an axle assembly for a vehicle, including wheels and axle sections that attach the vehicle body and an anti-roll bar that employs negative stiffness elements, in accordance with the disclosure.

DETAILED DESCRIPTION

Figure 1:
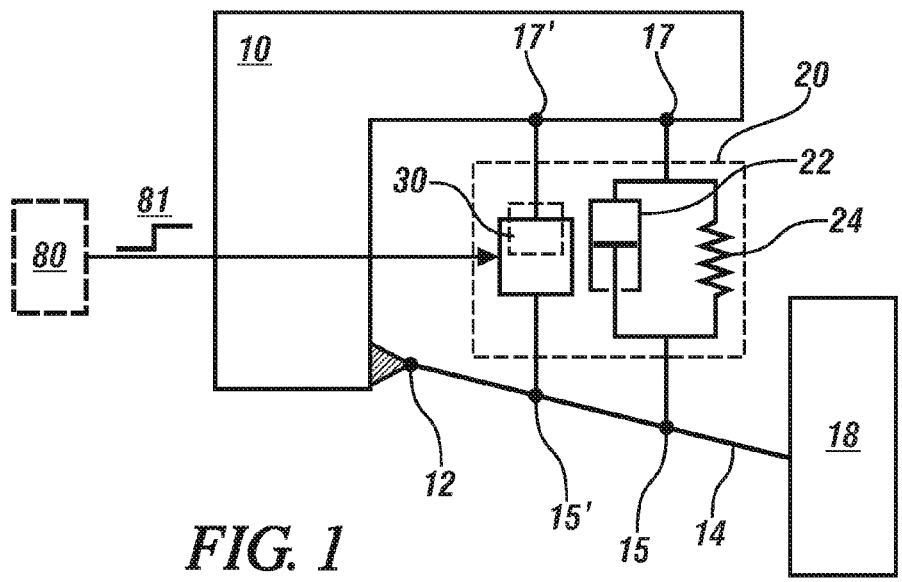
FIG. 1 illustrates a passive suspension assembly including a negative stiffness element that is employed to dampen vibration between a sprung element and an unsprung element, in accordance with the disclosure.

Referring now to the drawings, wherein the showings are for the purpose of illustrating certain exemplary embodiments only and not for the purpose of limiting the same, FIG. 1 schematically illustrates a passive suspension assembly 20 including a negative stiffness element 30 that is employed to dampen vibration between a sprung element and an unsprung element. As shown, the sprung element is a body 10 of a vehicle and the unsprung element includes a lower control arm 14 supporting a wheel assembly 18 that contacts a ground surface. The lower control arm 14 attaches to the body 10 at hinge point 12, and works in concert with an upper control arm to provide seating elements for mounting the wheel assembly 18. Details for mounting a vehicle wheel assembly 18 are known and thus not described herein. The suspension assembly 20 may be employed to dampen vibration between a sprung element and an unsprung element in a stationary setting with similar effect. The suspension assembly 20 incorporates the negative stiffness element 30 to maintain preferred performance while accommodating static and dynamic load changes, including supporting a large load in conjunction with a low dynamic stiffness to isolate vibrations. This enables reduction of the total spring rate to at or near zero while maintaining static load carrying capability. Such a system provides desirable ride performance for passenger comfort and wheel/tire road grip for safety while accommodating static load changes due to mass changes and accommodating dynamic load changes during handling maneuvers. The terms spring rate, spring constant and stiffness are analogous terms that all refer to a change in force exerted by a spring in relation to the deflection of the spring.

The suspension assembly 20 is a load-carrying element that supports and transfers static and dynamic forces and load inputs between the unsprung element 14 and the sprung element 10, i.e., the lower control arm 14 and the body 10. The suspension assembly 20 in the embodiment shown includes a spring 24, a damper 22, and negative stiffness element 30 arranged in parallel between the lower control arm 14 and the body 10. As shown, the spring 24 and damper 22 co-terminate on the lower control arm 14 at hinge point 15 and co-terminate on the body at hinge point 17. The negative stiffness element 30 terminates on the lower control arm 14 at hinge point 15' and terminates on the body at hinge point 17'. As shown and in one embodiment, the hinge point 15 and the hinge point 15' are different points, resulting in different moment arms for the forces exerted by the different elements. Alternatively, the hinge point 15 and the hinge point 15' are the same point. Similarly, as shown and in one embodiment, the hinge point 17 and the hinge point 17' are different points. Alternatively, the hinge point 17 and the hinge point 17' are the same point. In one embodiment, the suspension assembly 20 is a passive suspension system, which is defined as a suspension system that has no external control elements controlling operation of suspension devices, i.e., the spring 24, damper 22 and negative stiffness element 30. The spring 24 and damper 22 are illustrated as mechanical devices, but may be configured as any suitable spring and damper devices, including by way of example, pneumatic devices, hydraulic devices, mechanical devices and combinations thereof. The spring 24, damper 22 and negative stiffness element 30 dampen and otherwise accommodate vibrations input to the unsprung element 14, e.g., the lower control arm 14 supporting the vehicle wheel assembly 18 in contact with the ground surface while the vehicle is moving and while the vehicle is stationary. The suspension system 20 is configured to statically support a large load with a low dynamic stiffness that effects vibration isolation. Preferably the total spring rate of the combined elements of the suspension system 20 is at or near zero around a zero deflection point. Preferably the total spring rate of the combined elements of the suspension system 20 is at or near zero under static conditions responsive to variations in static vehicle loading and is responsive to dynamic load changes associated with vehicle handling, cornering and rough road conditions.

The function of the negative stiffness element 30 is to introduce a force in the suspension assembly 20 between the sprung element 10 and the unsprung element 14 that is counter to the force introduced by the spring 24, e.g., into the suspension of the vehicle under static conditions. The counter force of the negative stiffness element 30 assists in separating the sprung element 10 and the unsprung element 14, so long as the force acting on the sprung element 10 is less than a yield force of the negative stiffness element 30 taking into account any differences in the moment arms of the relevant elements. The negative stiffness element 30 provides a force that is counter to the spring force of the spring 24 and preferably has a negative spring rate at a magnitude that partially or fully cancels the positive spring rate of spring 24 at a zero deflection point of the suspension assembly 20 under static loading.

Figure 2:
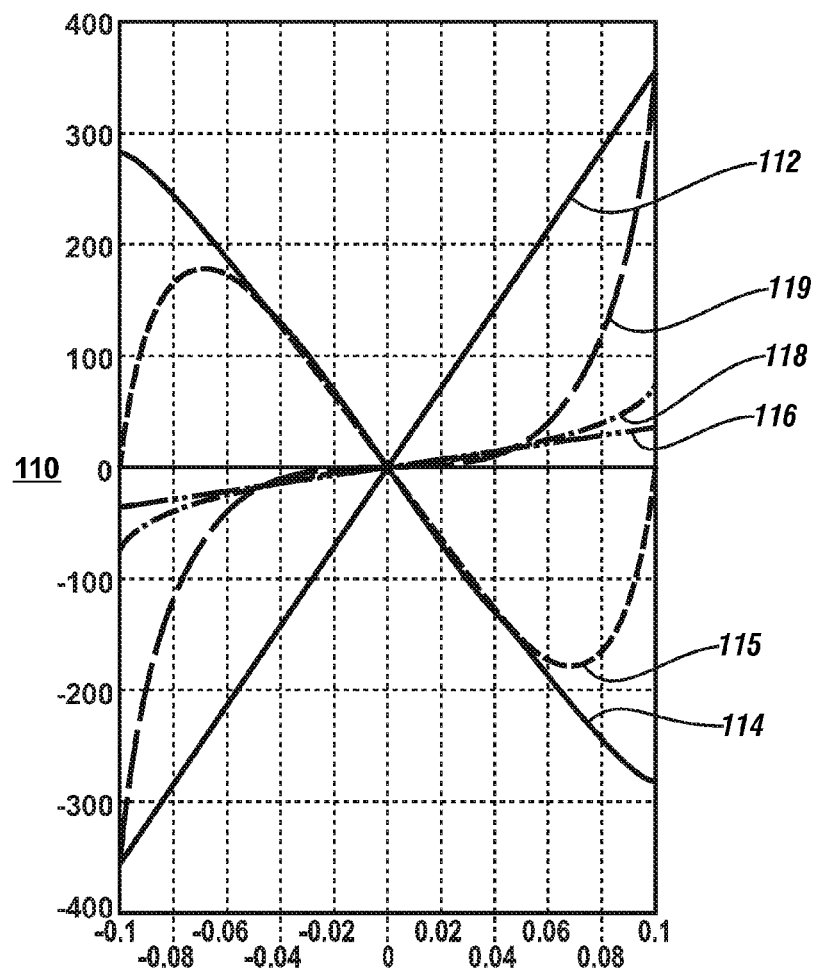
FIG. 2 illustrates deflection (m, travel) on a horizontal axis and load (N) on a vertical axis for suspension components including a spring and a negative stiffness element, with the deflection occurring between a sprung element and an unsprung element, in accordance with the disclosure.

FIG. 2 graphically shows deflection (m, travel) on a horizontal axis 120 and load (N) on a vertical axis 110 for suspension components including a linear spring and a negative stiffness element, with the deflection occurring between a sprung element and an unsprung element. A spring constant for a linear spring is shown on line 112 without a static load carrying component, and depicts a linear relation k between the deflection and the load. Line 116 depicts an idealized deflection in relation to load for a suspension system to achieve a force exerted between the sprung element and the unsprung element that is substantially constant regardless of the displacement, thus achieving a substantially constant force on the sprung element, e.g., a vehicle body, regardless of the force exerted on the unsprung element, e.g., a wheel. A negative stiffness element provides a force that is counter to the spring force 112. A negative stiffness element having a linear displacement is shown at line 114 along with a negative stiffness element having a non-linear displacement, shown at line 115. Line 118 graphically shows deflection for a system that combines the spring constant for the linear spring shown on line 112 and the negative stiffness element having linear displacement shown at line 114. Line 119 graphically shows deflection for a system that combines the spring constant for the linear spring shown on line 112 and the negative stiffness element having non-linear displacement shown at line 115. The performance shown at line 119 including deflection for a system that combines the spring constant for the linear spring shown on line 112 and the negative stiffness element having non-linear displacement achieves a result that include low/zero spring stiffness at low deflections, with increasing stiffness at greater deflections. Such spring performance achieves preferred performance characteristics related to passenger ride comfort, vehicle handling and road holding capability, including a soft spring (low magnitude spring rate k) to achieve isolation resulting in an operator-perceived comfortable ride in combination with a hard spring (large magnitude spring rate k) to reduce roll and pitch angles associated with steering and braking/accelerating maneuvers.

A negative stiffness element having linear displacement across its entire range provides improved ride performance as compared to a negative stiffness element having non-linear displacement. A negative stiffness element having non-linear displacement helps to reduce energy consumption in sharp turning maneuvers. Using a negative stiffness element having a non-linear displacement may eliminate a need to actively engage and disengage the negative stiffness element during a driving maneuver. There may still be a preference to configure the negative stiffness element to be engaged and disengaged for vehicle parking and/or for a fail-safe operation.

Figure 3:
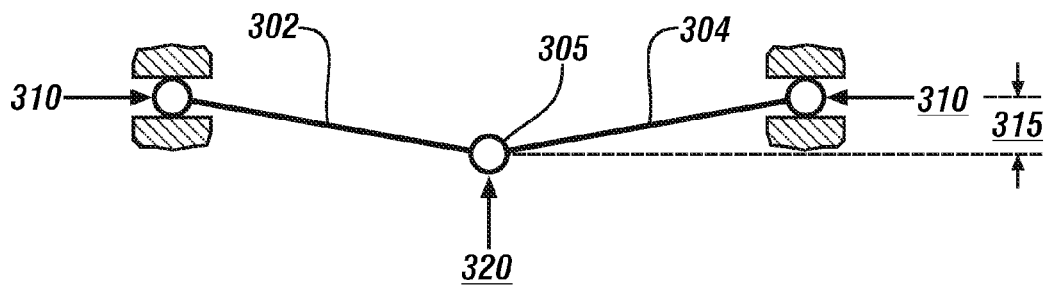
FIG. 3 illustrates a free-body diagram for a negative stiffness element, including deflection and associated force generated in a vertical direction in response to a force exerted in a horizontal direction, in accordance with the disclosure.

FIG. 3 shows a free-body diagram for a negative stiffness element, and shows deflection and associated force generated in a first direction, e.g., a nominal vertical direction in response to a force exerted in a second direction orthogonal to the first direction, e.g., a nominal horizontal direction. As shown, rigid elements 302 and 304 are connected in series at junction 305. A compressive force P 310 that is exerted on the distal ends of the elements 302 and 304 in the horizontal direction exerts a force $F_N$ 320 in the vertical direction at junction 305 that can be determined in relation to deflection δ 315 in the vertical direction. A stiffness constant $K_N$ can be determined in accordance with the following relationship.

$$K_N = \frac{F_N}{\delta} = \frac{2P}{1} \quad [1]$$

wherein l is the length of each of the rigid elements 302 and 304.

The stiffness constant $K_N$ indicates a negative spring constant associated with the negative stiffness element. The stiffness constant $K_N$ is tunable, with stiffness constant $K_N$ determined in relation to pre-loaded force P and lengths l of the rigid elements 302 and 304. The stiffness constant $K_N$ can be tuned to a preferred negative stiffness by varying the length l of each of the rigid elements 302 and 304, pre-loading the force P 310 that is exerted on the distal ends of the elements 302 and 304 in the horizontal direction, and adjusting the stiffness of a spring when such spring is employed to exert the force P 310.

Figure 4:
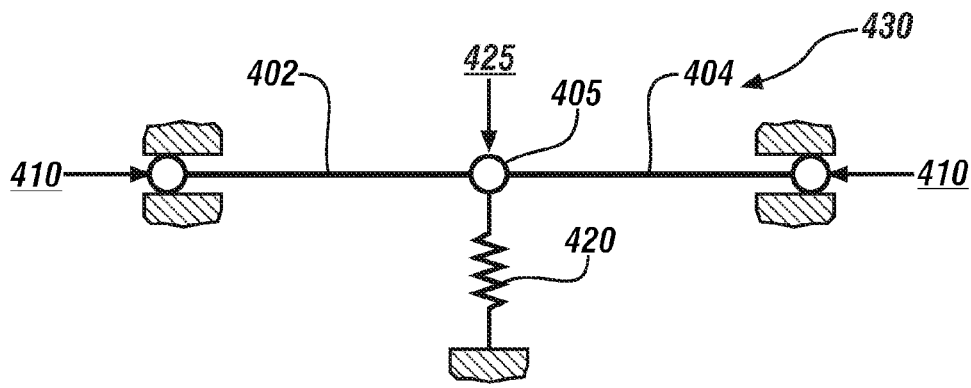
FIG. 4 illustrates a free-body diagram for a suspension system that includes a spring in combination with a negative stiffness element in the form of rigid elements connected in series at a junction and force exerted on distal ends of the elements in the horizontal direction, in accordance with the disclosure.

FIG. 4 shows a free-body diagram for a suspension system that includes a spring 420 in combination with a negative stiffness element 430 in the form of rigid elements 402 and 404 connected in series at junction 405 and force P 410 exerted on the distal ends of the elements 402 and 404 in the horizontal direction. Spring 420 acts in a vertical direction and has a spring constant $K_S$. Force 425 from the sprung mass is exerted on the suspension system in the vertical direction at junction 405. The overall spring constant K is a difference between the spring constant $K_S$ and the stiffness constant $K_N$, which can be determined in accordance with the following relationship.

$$K=K_S-K_N \qquad [2]$$

One system design objective is to have stiffness constant $K_N$ partially or completely cancel the spring constant $K_S$ under static loading conditions. This configuration permits a passive suspension system that is capable of supporting a large static load with a low dynamic stiffness to effectively isolate vibration, while enabling the overall spring constant K to approach zero under static conditions responsive to changes in vehicle static loading and is responsive to dynamic load changes associated with vehicle handling, cornering and rough road conditions.

Figure 5:
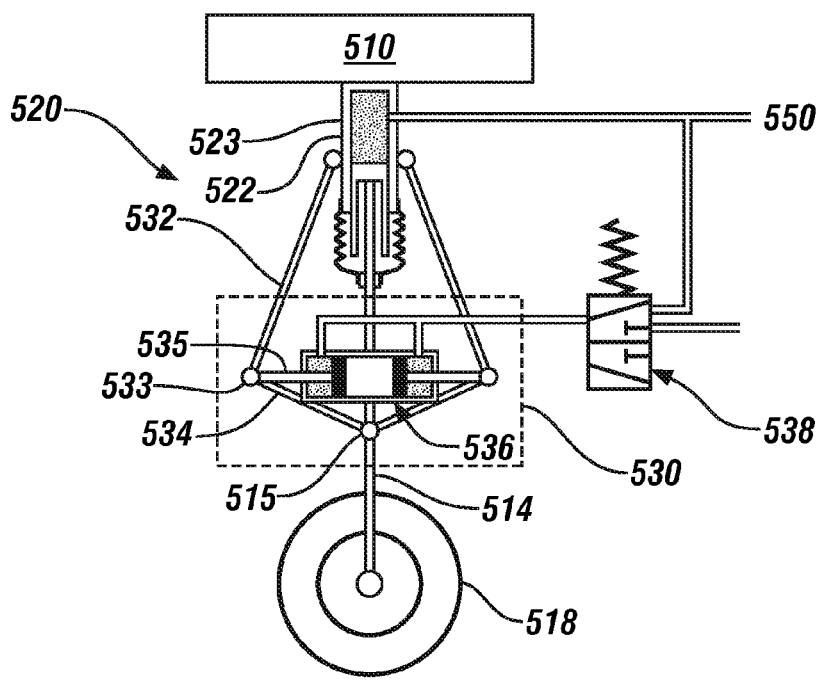
FIG. 5 illustrates an active suspension assembly that is attached between a vehicle body and a vehicle wheel assembly, in accordance with the disclosure.

FIG. 5 schematically shows an embodiment 520 of an active or semi-active suspension assembly that is attached between a sprung element, e.g., a vehicle body 510 and an unsprung element, e.g., a vehicle wheel assembly 518. The active suspension assembly 520 in this embodiment includes an air spring 523 that is configured to provide spring function and a damper function. As shown, the air spring 523 employs compressed air from an on-vehicle pressurized air supply 550 to effect level adjustment. The pressurized air supply 550 may operate to slowly effect level adjustment. Although not shown or described herein, other active suspension functions may be incorporated. A negative stiffness element 530 is arranged in parallel between lower control arm 514 and the body 510. The negative stiffness element 530 includes a plurality of linkage assemblies, with each linkage assembly including an upper bar 532 attached to a body 522 of the air spring 523 on one end and at hinge 533 at a second end, a lower bar 534 attached at hinge 533 on one end and at hinge 515 on the lower control arm 514 at a second end, and a horizontal bar 535 attached to hinge 533 at one end and to a plunger element of a pneumatic cylinder 536 at a second end. Two linkage assemblies are illustrated. In operation, air pressure originating from air supply 550 and channeled through control valve 538 acts on the plunger elements of pneumatic cylinder 536 to urge the horizontal bar 535 toward a longitudinal axis of the suspension assembly 520. The urging of the horizontal bar 535 toward the longitudinal axis of the suspension assembly 520 generates a vertically upward separating force on the body 522 of the air spring 523 relative to the lower control arm 514 and the wheel assembly 518. Such force remains in effect so long as the control valve 538 is controlled in an activated position as shown. When the control valve 538 is deactivated, the air acting on the plunger elements of pneumatic valve 536 ceases urging the horizontal bar 535 toward a longitudinal axis of the suspension assembly 520, and gravitational forces return the suspension system 520 to an operating state that does not include the negative stiffness element 530. Thus the control valve 538 is able to selectively activate and selectively deactivate the negative stiffness element 530 using the pneumatic cylinder 536. The control valve 538 can also adjust the magnitude of the spring force exerted by the negative stiffness element 530 by adjusting the air pressure in the pneumatic cylinder 536.

Figure 6:
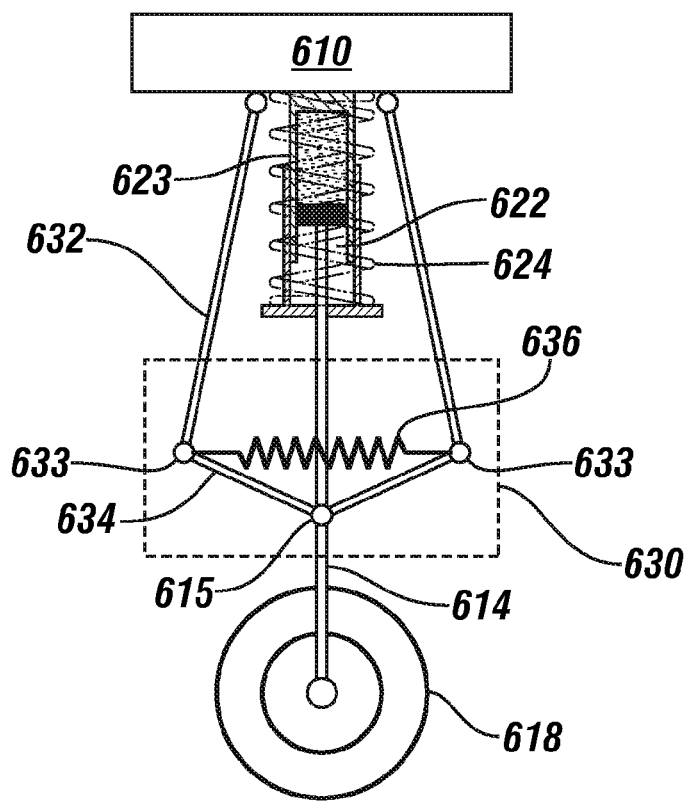
FIG. 6 illustrates one exemplary passive suspension assembly that is attached between a vehicle body and a vehicle wheel assembly, in accordance with the disclosure.

FIG. 6 schematically shows an embodiment 620 of a passive suspension assembly described herein that is attached between a vehicle body 610 and a vehicle wheel assembly 618. The suspension assembly 620 in this embodiment includes spring 624, damper 622, and negative stiffness element 630 arranged in parallel between a lower control arm 614 and the body 610. As shown, the spring 624 and damper 622 are passive devices. The negative stiffness element 630 includes a plurality of linkage assemblies, with each linkage assembly including an upper bar 632 attached to the spring 624 on one end and at hinge 633 at a second end, a lower bar 634 attached at hinge 633 on one end and at hinge 615 on the lower control arm 614 at a second end. Two linkage assemblies are illustrated, and a tension spring 636 attaches between the hinges 633 of the linkage assemblies. In operation, the tension spring 636 exerts a tensile force between the hinges 633 in accordance with a negative spring constant $K_N$ of the tension spring 636. The tensile force exerted on the hinges 633 urges the hinges 633 toward the longitudinal axis of the suspension assembly 620 to generate a vertically upward separating force on the spring 624 relative to the lower control arm 614 and the wheel assembly 618, thus effecting negative stiffness.

Figure 7:
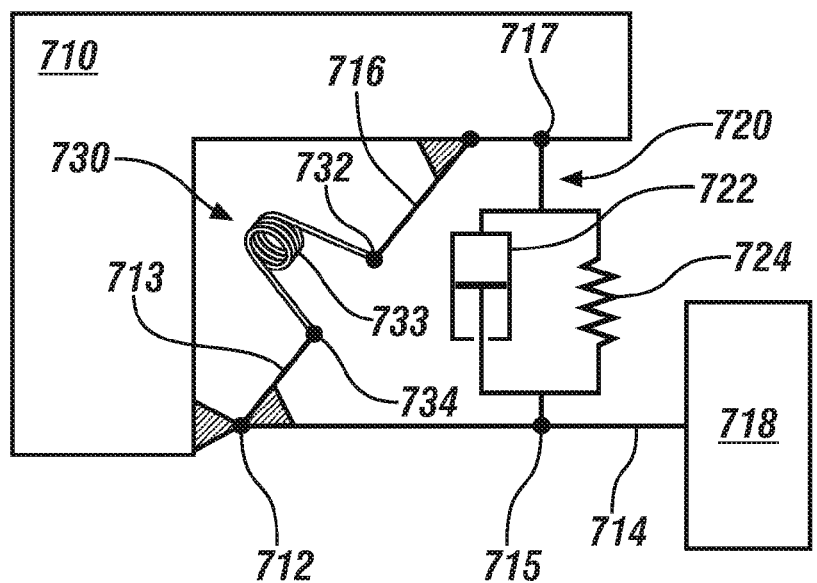
FIG. 7 shows another exemplary passive suspension assembly that is attached between a vehicle body and a vehicle wheel assembly, in accordance with the disclosure.

FIG. 7 schematically shows another embodiment of a suspension assembly 720 described herein that is attached between a vehicle body 710 and a vehicle wheel assembly 718. The suspension assembly 720 in this embodiment includes a spring 724 and damper 722 arranged in parallel and arranged in parallel with negative stiffness element 730. One end of the spring 724 and damper 722 connect to a lower control arm 714 at hinge 715, and a second opposing end attaches to the body 710 at hinge 717. The negative stiffness element 730 includes a negative stiffness device 733 connected between members 713 and 716. Connection point 732 shows the connection between the negative stiffness device 733 and member 716. Member 716 attaches to the body 710 at or near hinge 717, preferably in a rigid manner such that it does not rotate in relation to the body 710. Member 713 rigidly connects to the lower control arm 714 and both connect to hinge 712 such that movement of the wheel 718 relative to the body 710 that causes rotation of the lower control arm 714 on hinge 712 also causes an equal rotation of the member 713. Rotation of the member 713 causes a reaction by the negative stiffness device 733. The negative stiffness device 733 is configured to exert a compressive force thus urging the lower control arm 714 downwardly, thus acting in a manner analogous to the negative stiffness elements previously described.

Figures 1, 8:
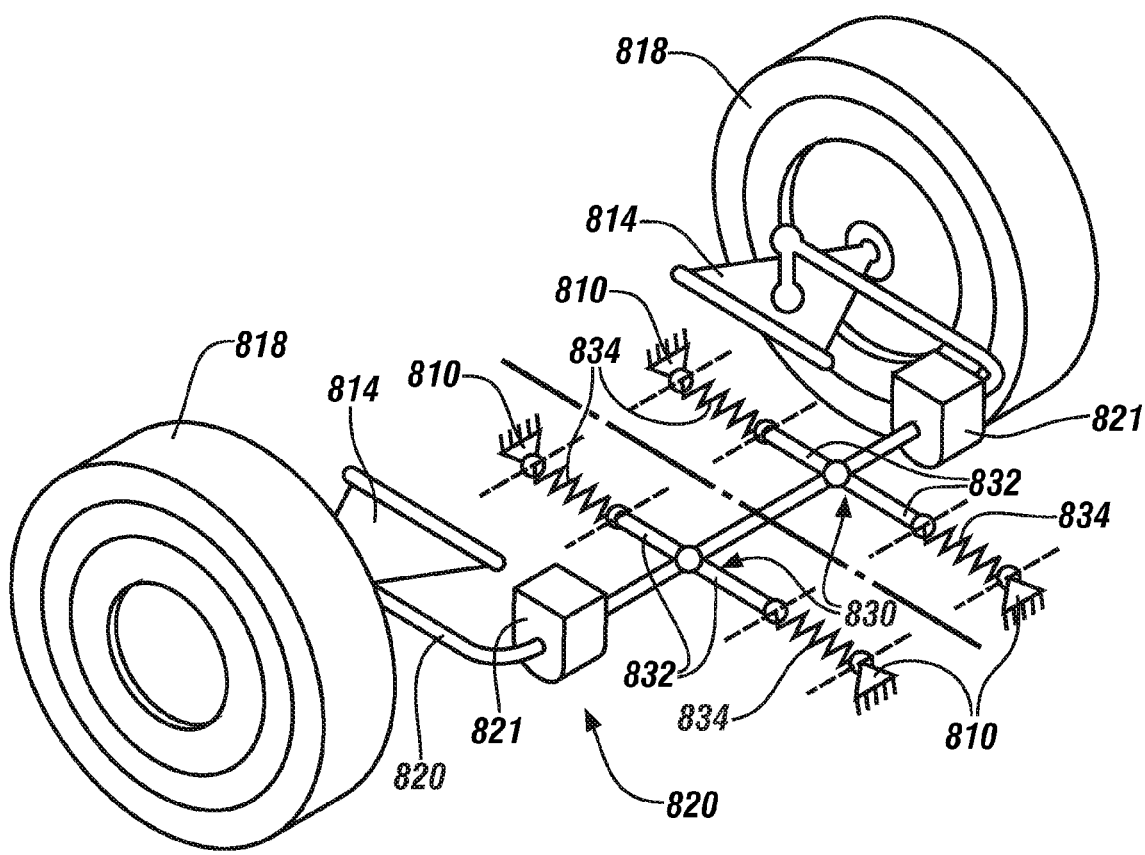
Figures 2, 8:
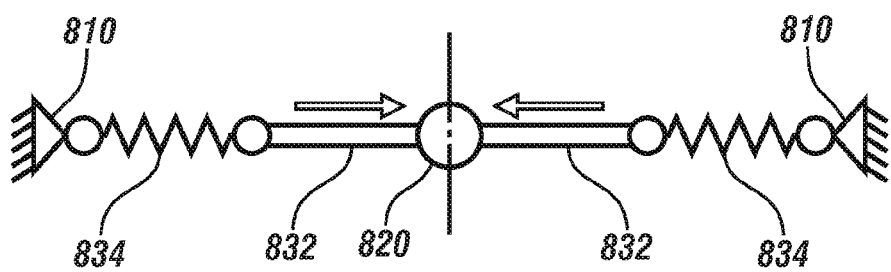
Figures 3, 8:
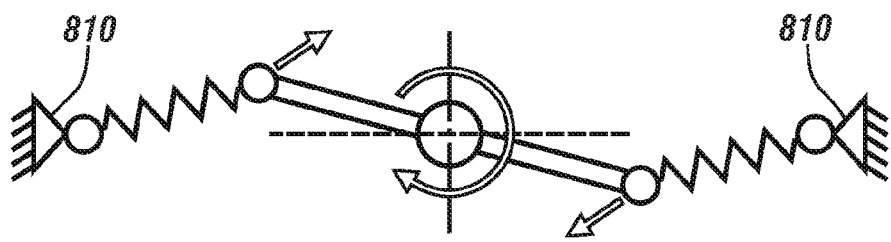

FIG. 8-1 shows one axle assembly for a vehicle including wheels 818, axle sections 814 that attach the vehicle body 810 and an anti-roll bar 820. The anti-roll bar 820 mounts via brackets 821 to the body 810 and connects to axle sections 814. Negative stiffness elements 830 are located on a right side of the vehicle and a left side of the vehicle. Each negative stiffness element 830 includes rigid elements 832 that are orthogonal to and rigidly connected to the anti-roll bar 820. Preferably the rigid elements 832 are parallel with the ground surface. In one embodiment, each rigid element 832 projects fore and aft the anti-roll bar 820. Each of the rigid elements 832 has an end that is connected to a first end of spring 834. A second opposite end of the spring 834 is connected to the body 810. Under static conditions and steady state vehicle operation, the opposing springs 834 connected to opposed rigid elements 832 are under compression and exert opposed normal forces in the direction of the anti-roll bar 820 to create negative stiffness, as shown with reference to FIG. 8-2. Under conditions wherein there is vertical movement of one of the wheels 818 relative to the body 810 such as vehicle turning or under a rough road condition that induces twisting of one or both sides of the anti-roll bar 820, the opposing springs 834 connected to the ends of the rigid elements 832 are extended and exert torsional forces on the anti-roll bar 820 in a direction that is the same as the induced twist and thus do not interfere with the function of the anti-roll bar 820, as shown with reference to FIG. 8-3.

Figure 9:
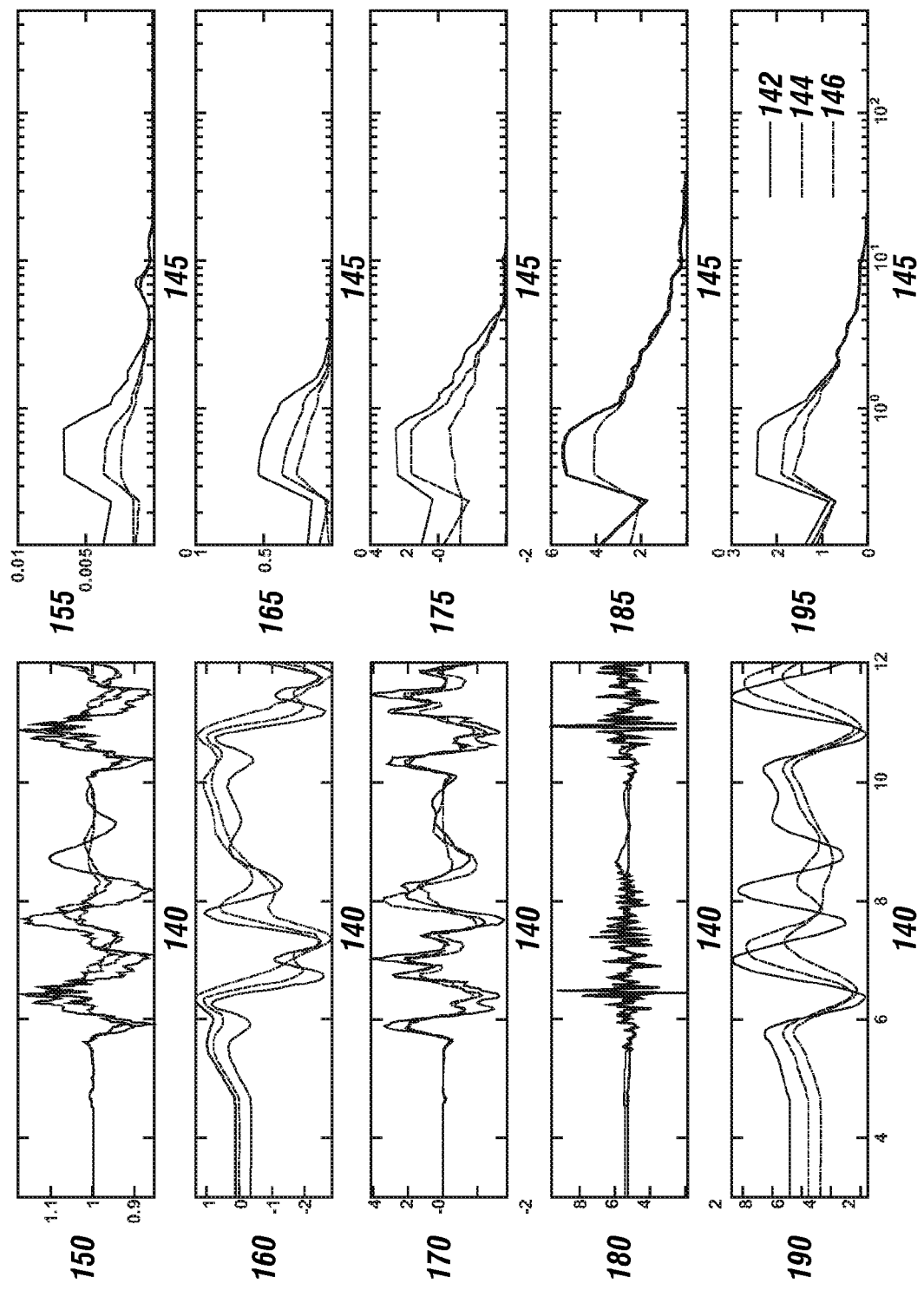
FIG. 9 illustrates operating data associated with simulated performance of a vehicle executing a maneuver that tests suspension system performance including performance parameters shown in relation to time (sec) and frequency (Hz), in accordance with the disclosure.

FIG. 9 graphically shows operating data associated with simulated performance of a vehicle executing a maneuver that tests suspension system performance, e.g., a waddles maneuver. The data includes several performance parameters shown in relation to time (sec) 140 or frequency (Hz) 145. The parameters include heave acceleration (g) 150, roll (deg) 160, pitch rate (deg/s) 170, impulse (kN) 180, heave (m) 190, all in relation to time 140. The parameters include heave acceleration (g) 155, roll rate (deg/s) 165, pitch rate (deg/sec) 175, flow (l/min) 185 and jounce 195, all in relation to frequency 145. Each of the graphs includes data including a vehicle operating with a known controlled or active suspension system employing magneto-rheological dampers 142, a vehicle operating with a suspension system described herein employing a passive system with a negative stiffness element that has a non-linear displacement 144, and a vehicle operating with a suspension system described herein employing a passive system with a negative stiffness element that has a linear displacement 146. Analysis of the data indicates that a suspension system employing a passive negative stiffness element outperforms the active suspension system in each of the parameters.

A vehicle operating with a suspension system employing a passive system with a negative stiffness element may employ one of a variety of technologies that employ negative stiffness and can be integrated into the suspension system, including a corner strut or an anti-roll bar, including systems employing vehicle leveling, e.g., a four-corner air spring. The negative stiffness elements can include mechanisms to trim the negative stiffness element relative to a positive suspension spring and a mechanism for disengaging the negative stiffness element. A negative stiffness element using non-linear negative stiffness characteristics may further employ negative stiffness elements in an anti-roll bar to avoid a need to activate and deactivate the system during handling maneuvers.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A suspension assembly between a sprung element and an unsprung element, comprising:
    a load-carrying spring arranged in parallel with a negative stiffness element between the sprung element and the unsprung element;
    the spring affixed to the sprung element at a first hinge point of the sprung element and affixed to the unsprung element at a hinge point of the unsprung element, the spring configured with a positive spring rate to support a static load of the sprung element; and
    the negative stiffness element affixed to the sprung element at a second hinge point of the sprung element and affixed to the unsprung element at a hinge point of the unsprung element, the negative stiffness element configured with a negative spring rate and to exert a force opposing the spring rate of the spring, said negative spring rate having a magnitude that cancels the positive spring rate at a zero deflection point of the suspension assembly.

2. The suspension assembly of claim 1, wherein said negative spring rate comprises a magnitude that fully cancels the positive spring rate at a zero deflection point of the suspension assembly.

3. The suspension assembly of claim 1, wherein said negative spring rate comprises a magnitude that partially cancels the positive spring rate at a zero deflection point of the suspension assembly.

4. The suspension assembly of claim 1, wherein the suspension assembly comprises a passive device.

5. The suspension assembly of claim 1, wherein the negative spring rate of the negative stiffness element is non-linear.

6. The suspension assembly of claim 1, wherein the load-carrying spring co-terminates on the unsprung element with the negative stiffness element.

7. The suspension assembly of claim 1, further comprising a hydraulic damper arranged in parallel with the spring.

8. A suspension assembly between a vehicle body and a wheel assembly, comprising:
    a load-carrying spring element arranged in parallel with a negative stiffness element between the vehicle body and the wheel assembly;
    the spring element affixed to the sprung element at a first hinge point of the sprung element and affixed to the unsprung element at a hinge point of the unsprung element, the spring configured with a positive spring rate to support a static load of the spring element;
    the negative stiffness element affixed to the sprung element at a second hinge point of the sprung element and affixed to the unsprung element at a hinge point of the unsprung element, the negative stiffness element configured to exert a force opposing the spring element, said negative stiffness element configured with a negative spring rate; and
    the negative spring rate of the negative stiffness element in combination with the positive spring rate of the spring element achieving a low spring rate between the vehicle body and the wheel assembly under static loading of the suspension assembly.

9. The suspension assembly of claim 8, wherein said negative spring rate of the negative stiffness element in combination with the positive spring rate of the spring element achieves a spring rate equal to zero.

10. The suspension assembly of claim 8, wherein the load-carrying spring element co-terminates on the unsprung element with the negative stiffness element.

* * * * *